US012584512B2

(12) United States Patent
Ekström et al.

(10) Patent No.: US 12,584,512 B2
(45) Date of Patent: Mar. 24, 2026

(54) UNIVERSAL FASTENING LOCK

(71) Applicant: Rimgard Sweden AB, Solna (SE)

(72) Inventors: Marcus Ekström, Stockholm (SE); Lars Ivarsson, Hägersten (SE)

(73) Assignee: Rimgard Sweden AB, Solna (SE)

( * ) Notice: Subject to any disclaimer, the term of this patent is extended or adjusted under 35 U.S.C. 154(b) by 75 days.

(21) Appl. No.: 18/413,598

(22) Filed: Jan. 16, 2024

(65) Prior Publication Data

US 2025/0230834 A1 Jul. 17, 2025

(51) Int. Cl.
*F16B 41/00* (2006.01)
*B60B 3/16* (2006.01)
*E05B 9/04* (2006.01)

(52) U.S. Cl.
CPC ............ *F16B 41/005* (2013.01); *B60B 3/165* (2013.01); *E05B 9/04* (2013.01)

(58) Field of Classification Search
CPC ........ F16B 41/00; F16B 41/005; B60B 3/165; E05B 9/04; Y10T 70/5854; Y10T 70/5858; Y10T 70/5863; Y10T 70/5867
USPC .................................................... 70/229–232
See application file for complete search history.

(56) References Cited

U.S. PATENT DOCUMENTS 3,744,282 A * 7/1973 Hemphill ............ E05B 73/0082 70/58
3,782,146 A * 1/1974 Franke .................... E05B 73/00 166/85.1
4,856,305 A * 8/1989 Adams ................ E05B 73/0082 70/164
5,024,073 A * 6/1991 Lloyd ................... F16B 41/005 70/34
5,904,383 A * 5/1999 van der Wal ........... B63B 17/00 70/229
11,788,574 B2 10/2023 Ivarsson et al.
2006/0228191 A1* 10/2006 Ward, Jr. .............. F16B 41/005 411/429
2016/0032959 A1* 2/2016 Cadena ................... B60B 3/165 411/110
2024/0369095 A1* 11/2024 Ivarsson ............... F16B 41/005

FOREIGN PATENT DOCUMENTS

GB 2073298 A * 10/1981 ............ F16B 41/005
WO WO-2023018580 A1 * 2/2023 ............. B60B 3/165

* cited by examiner

*Primary Examiner* — Suzanne L Barrett
(74) *Attorney, Agent, or Firm* — Koivula & Somersalo LLC

(57) ABSTRACT

Universal fastening lock comprises fastening element having crown and shaft with threaded inner or outer surface, lock housing, and key operatable cylinder lock with a latch. The shaft is configured to fasten the fastening lock to a stud or a bore on a fastening surface. The crown has a cavity with an access to a drive at its bottom. The cavity is configured rotatably and connectably receive the lock housing by retention ring(s) securing lock housing into cavity. A spring/wave washer is located on the bottom to provide tension. The fastening lock is in locked position when cylinder lock is in position where the latch is restrained by notch inside lock housing, and in open position when cylinder lock is in position where the latch is not restrained by the notch and the cylinder lock is removable allowing access through the bottom of the cavity to the drive.

10 Claims, 4 Drawing Sheets

UNIVERSAL FASTENING LOCK

FIELD OF THE INVENTION

This disclosure is generally related to locking devices. The disclosure is related to fastening systems and security solutions.

BACKGROUND

In the modern world security has become more and more important, whether it is security to prevent unauthorized persons to have access to private or protected spaces, or whether it is security to prevent unauthorized persons to have access to use devices, or simply to steal or destruct property. Furthermore, a security issue may arise when devices that may have dangerous features are not protected properly.

There are various types of locks available that are suitable for locking doors, or entryways. Similarly, there are various anti-theft locks available to prevent unauthorized removal of valuable items. However, because the locking methods are highly variable, solutions that could be used in multiple purposes or settings are scarce.

Examples of an anti-theft devices include devices that are meant to prevent unauthorized removal of car wheels. Such devices are usually suitable only for this limited purpose. An example of such solution is the inventor's own patented disclosure U.S. Pat. No. 11,788,574 for locking car wheels by a locking bolt assembly. This device is designed for car wheels attached by bolts. However, such device is not suitable for every car brand, because numerous brands use lug attachment instead of bolt attachment for the wheels. Moreover, the solution is specifically designed for preventing removal of car wheels and thus not applicable to other type of security solutions.

Accordingly, there is a need for an universal fastening lock that would be suitable for various purposes to provide increased security and prevent unauthorized use of items or access to various spaces.

SUMMARY

In view of the above, an object of this disclosure is to provide a technology that addresses at least some of the above concerns.

Thus, according to a first aspect, a universal fastening lock (1) is provided. The lock is versatile and can be used in diverse applications, adapting to standard bolt/lug nut fastening systems. The universal lock is user-friendly and facilitates straightforward installation for users with varying technical expertise. The universal fastening lock is suitable for safeguarding assets ranging from industrial machinery, construction equipment, to vehicle wheels among others. The universal lock is suitable for preventing access through residential gates, manhole covers and other openable entries. Accordingly, disclosed here is the universal fastening lock and methods to use the lock.

It is an object of this this disclosure to provide a universal fastening lock (1) comprising a fastening element (10) having a crown (16) and a shaft (12) comprising a threaded surface (14); a lock housing (28); and a cylinder lock (30) having a latch (32) and being operatable with a unique mechanical key; wherein the shaft (12) is configured to fasten the universal fastening lock (1) to a fastening surface, and wherein the crown (16) comprises a cavity (18) having a bottom (20) with an access to a drive (22) in the bottom of the cavity and a spring/wave washer (26) located on the bottom (20), and the cavity (18) is configured rotatably and connectably receive the lock housing (28) by at least one retention ring (24) configured to secure an axial position of the lock housing (28) and the spring/wave washer (26) configured to provide tension to the lock housing (28) and for low torque prevent rotational movement of the lock housing (28), wherein the lock housing (28) is configured to adapt the cylinder lock (30), and wherein the universal fastening lock (1) is in locked position when the cylinder lock (30) is turned with the unique key to a position where the latch (32) is restrained by a notch (34) inside the lock housing (28), and the universal fastening lock (1) is in open position when the cylinder lock (30) is turned with the unique key to a position where the latch (32) is not restrained by the notch (34), and in the open position the cylinder lock (30) is removable allowing entry to the drive (22) though the bottom (20) of the cavity of the crown (16) to remove the fastening element (10).

It is an object of this disclosure to provide a universal fastening lock as above, wherein the at least one retention ring (24) is configured to fill a space formed by at least one groove (2) on an outer surface of the lock housing (28) coinciding with one of at least one groove (5) on an inner surface of the crown.

Another object of this disclosure is to provide a universal fastening lock as above, wherein the shaft (12) is a solid element and the threaded surface of the shaft is on an outer surface of the shaft, and the universal fastening lock is configured to be attached through a hole in an article to the fastening surface by threading the shaft to matching threads of a bore of the fastening surface and wherein removal of the lock housing allows entry to the drive of the fastening element. The article may be any article that is intended to be protected from unauthorized removal, or unaughorized opening or use. Non limiting examples of articles may be car wheel, construction side shields, various kind of machinery, manhole covers, playground devices and so on. The fastening element may be any solid surface having suitable bore; e.g. ground surface, inner surface of a manhole, car wheel hub, wall structure etc.

Another object of the invention is to provide a universal fastening lock (1) as above, wherein the shaft (12) is a hollow element having an inner and an outer surface and the threaded surface of the shaft is on the inner surface, and the universal fastening lock is configured to be attached through a hole in an article to a fastening surface by threading the shaft to matching threads of a stud projecting from the fastening surface, and removal of the lock housing allows entry to the drive (22) in the bottom (20) of the cavity of the crown (16) to remove the fastening element (10). The article may be any article that is intended to be protected from unauthorized removal, or unauthorized opening or use. Non limiting examples of articles may be car wheel, construction side shields, various kind of machinery, manhole covers, playground devices and so on. The fastening element may be any solid surface having suitable stud; e.g. ground surface, inner surface of a manhole, car wheel hub, wall structure etc.

It is an object to this disclosure to provide a method to fasten an article to a fastening surface, the method comprising: providing the universal fastening lock as above; fitting the shaft of the universal fastening lock through a hole in the article and matching the threading of the shaft with a threading of a stud or a bore on or in the fastening surface; inserting the cylindric lock into the lock housing and locking the cylindric lock with the unique key. The article may be any article that is intended to be protected from unauthorized removal, or unauthorized opening or use. Non limiting examples of articles may be car wheel, construction side shields, various kind of machinery, manhole covers, playground devices and so on. The fastening element may be any solid surface having suitable bore or stud; e.g. ground surface, inner surface of a manhole, car wheel hub, wall structure etc.

DETAILED DESCRIPTION

The universal fastening lock described and claimed here is meant to be used to secure and prevent unauthorized removal, use, or opening of articles attached to a fastening surface with the universal fastening lock. The universal fastening lock described here is suitable for use to attach any item that has a hole suitable to allow the shaft of the fastening element to penetrate through the hole to a fastening surface underneath or adjacent to the article having a bore or a stud having threads matching with the threads of the shaft. The lock can be opened with a unique mechanical key that allows access to remove the fastening element from the protected article. Using any other key would result rotation of a lock housing relative to the fastening element without torque and consequently the lock housing cannot be removed and no access to the fastening element can be gained.

The article may be any article that is intended to be protected from unauthorized removal, or unauthorized opening or use. Non limiting examples of articles may be car wheels, construction side shields, various kinds of machinery, manhole covers, playground devices and so on. The fastening element may be any solid surface having suitable bore or stud; non limiting examples may be ground, floor, ceiling surface, inner surface of a manhole, car wheel hub, wall structure etc.

Figure 3:
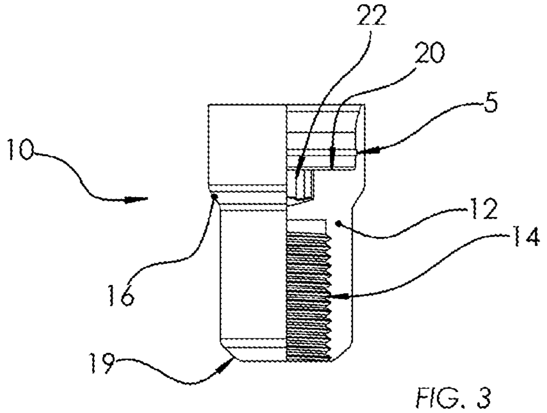
FIG. 3. is a cross-sectional view of a universal fastening lock where the fastening element is a lug element.
Figure 4:
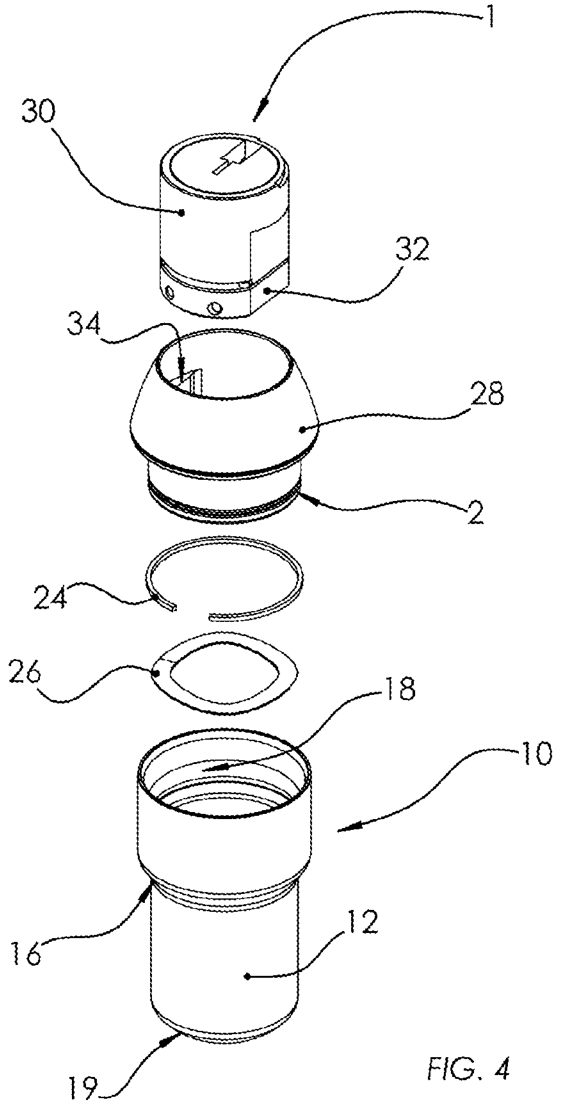
FIG. 4 is an exploded view of a universal fastening lock where the fastening element is a lug element.
Figure 5:
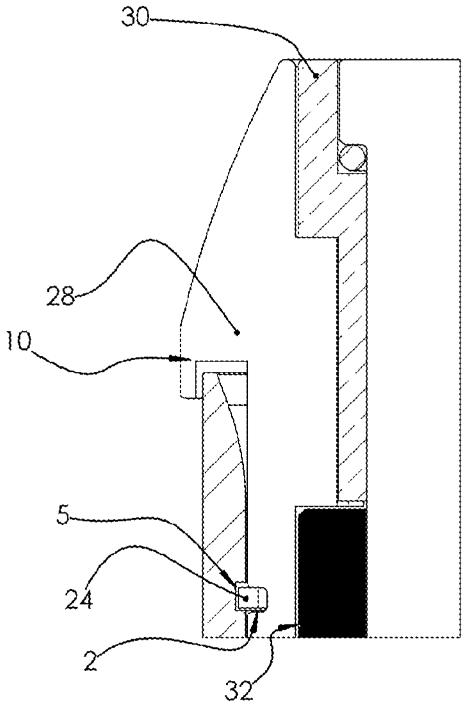
FIG. 5 is a cross-sectional partial view of the universal fastening lock.

The universal fastening lock is described below in light of the non-limiting drawings. As is illustrated in FIGS. 1-4, the universal fastening lock (1) comprises a fastening element (10) having a shaft (12) which has a threaded surface (14), a crown (16), and a cylinder lock (30). The crown (16) has a cavity (18) which is configured to rotatably and connectably receive a lock housing (28). The cavity has a bottom (20) and a drive (22). A spring or a wave washer (26) is located in the bottom of the cavity. The lock housing is secured into the cavity (18) with one or more retention rings (24). FIG. 5 shows the location of a retention ring (24): the retention ring fills a space that is formed by a groove (2) on an outer surface of the lock housing (28) and a groove (5) on a surface of the cavity (18) of the crown. There may be one or more retention rings (24), and one or more grooves (2, 5) which when coinciding, form the spaces for the retention rings. The purpose of the retention ring(s) is to secure the axial position of the lock housing (28). When the lock housing (28) is properly inserted into the cavity the two grooves (2,5) coincide forming a space for the retention ring. The wave washer or spring (26) is configured to add tension to the lock housing (26) once the cylindrical lock (30) is inserted in the lock housing allowing the unique mechanical key to operate the cylinder lock (30) without rotating the lock housing (28) and thus the cylinder lock (30). If wrong mechanical key or any other object is tried to operate the cylinder lock (30) it will together with the lock housing (28) rotate relative to the fastening element (10) thus no torque can be transferred, and the cylindrical lock which when in closed position has the latch (32) restrained behind the notch (34) inside the lock housing (28) cannot be removed, and as result no access is gained to the drive of the fastening element (10).

To engage with the fastening element (10) the cylinder lock (30) must be opened with correct mechanical key (unique key) and while in its open position the latch (32) will no longer be restrained by the notch (34) within the lock housing. The notch locates in the inner surface of the lock housing (28). In the open position the cylinder lock (30) can be removed from the lock housing (28) to gain access to the drive (22) in the crown (16) of the fastening element (10).

Figure 1:
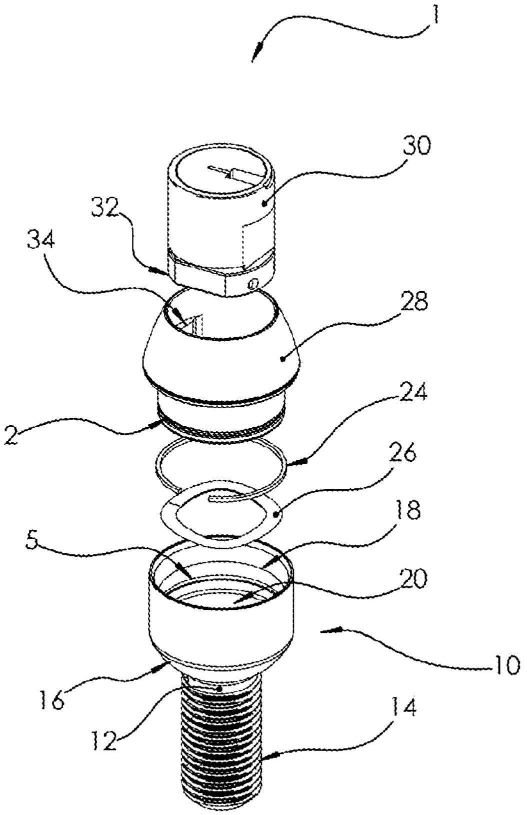
FIG. 1 is an exploded view of the universal fastening lock where the fastening element is a bolt element.
Figure 2:
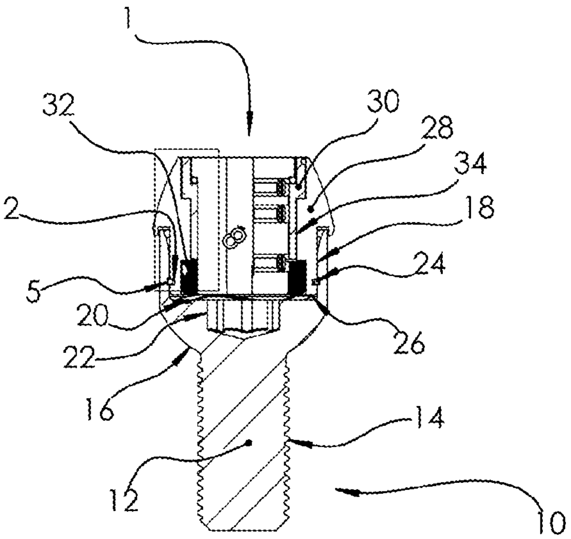
FIG. 2. is a cross-sectional view of a universal fastening lock where the fastening element is a bolt element.

The shaft (12) of the universal fastening lock may be adapted to function as a bolt or as a lug nut. When the fastening lock is configured to function as a bolt, the shaft (12) is a solid element having a threaded outer surface (FIGS. 1 and 2). The threads are matching with threads of a bore located in a fastening surface onto which article or item is to be attached. Exemplary wise, the universal fastening lock can be used to secure a vehicle wheel that is attachable to the vehicle with bolts. In this case the shaft is configured to penetrate an attachment hole of the wheel and the fastening surface is the wheel hub that has the threaded bore into which the shaft is threadedly fitted. The shaft (12) of the universal fastening lock having threaded outer surface can thus be used to attach the wheel to the vehicle instead of a regularly used bolt. Once the universal fastening lock is attached by the shaft threaded to the bore, the cylindric lock (30) is inserted into the lock housing (28). By turning a unique key in the key hole of the cylindric lock the latch (32) of the lock becomes restricted behind the notch (34) in the inner surface of the lock housing and an access to the drive is no more available and the articles securely fastened to the fastening surface. Figures I and 2 show the threaded outer surface of the shaft.

The universal fastening lock having the threading on the outer surface of the shaft can be used in similar manner to attach any item that has a hole suitable for inserting the shaft through to any fastening surface having a bore having threads matching the threads of the surface. Examples of items that may be attached to a fastening surface this way are construction shields, manhole covers, playground devices and so on. The fastening surface can be any solid surface. The universal lock can be made with different lengths and diameter of the shaft for different type of uses.

Figure 6:
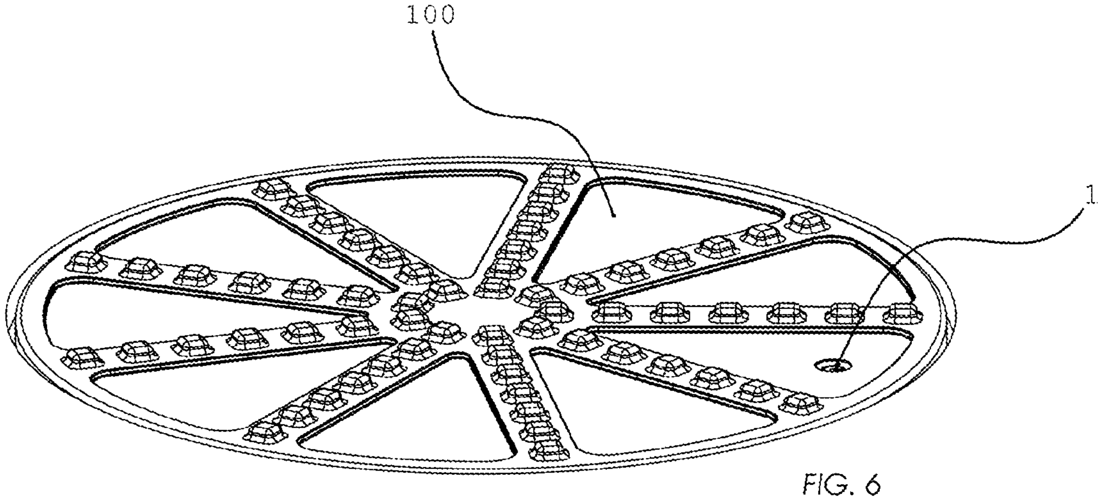
FIG. 6 is a schematic illustration of a manhole cover locked in place with the universal fastening lock.
Figure 7:
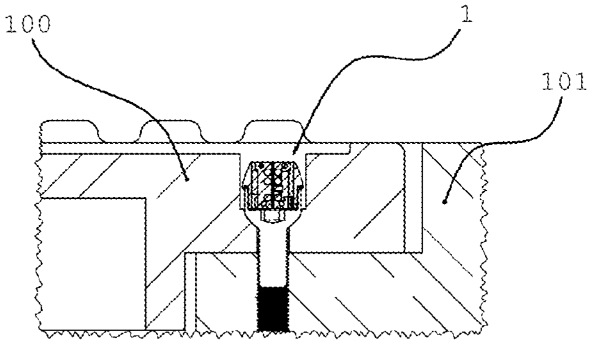
FIG. 7 is a cross sectional view of a manhole cover attached to a fastening surface underneath the cover with the universal fastening lock FIG. 8. is a schematic illustration of a vehicle wheel attached though attachment hole to a wheel hub with the universal fastening lock.

FIGS. 6 and 7 shows an example where the universal fastening lock is used to attach a manhole cover onto a surface underneath the cover.

Figure 8:
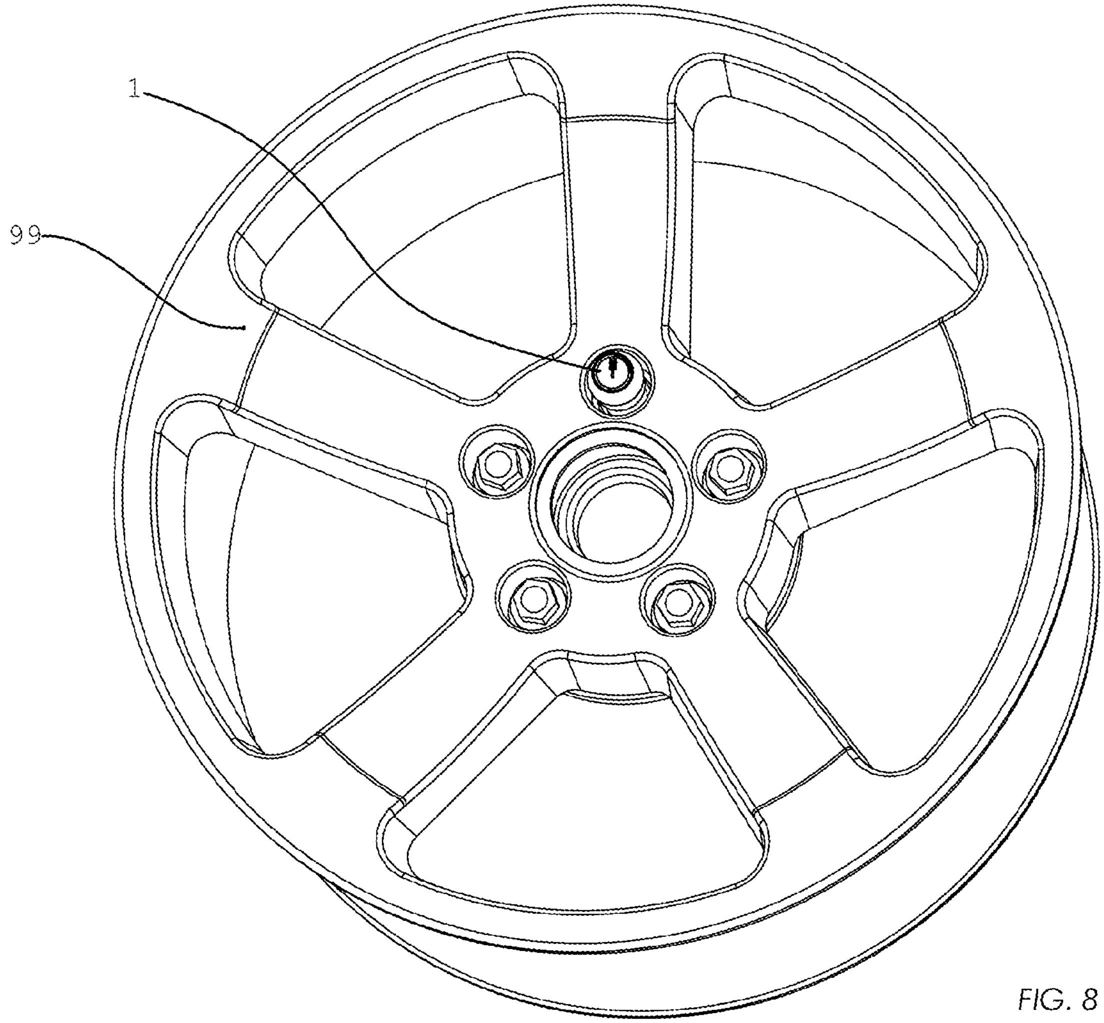
Figure 9:
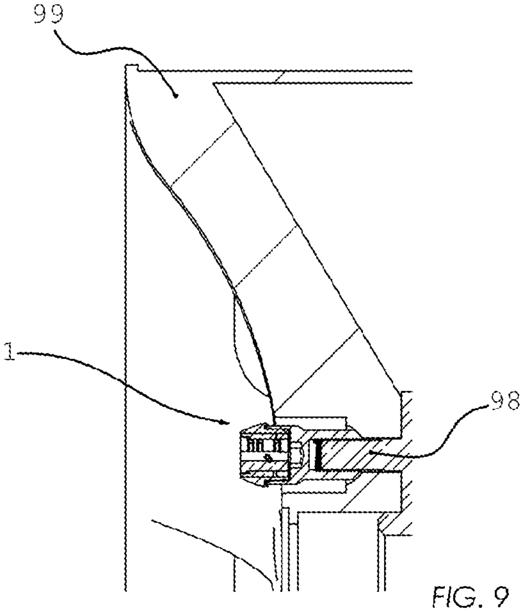
FIG. 9 is a cross sectional view of a vehicle wheel attached through an attachment hole to stud projecting from the fastening surface underneath wheel.

When the shaft (12) of the universal fastening lock is adapted to function as a lug, the shaft is a hollow element having threaded inner surface. The threads are matching with threads of a stud protruding from a fastening surface onto which article is to be attached or secured to. FIGS. 3 and 4 show the threaded inner surface of the shaft. Exemplary wise, the universal lock can be used to secure a vehicle wheel that is attachable to the vehicle with lugs. In this case the shaft is configured to penetrate an attachment hole of the wheel and the fastening surface is the wheel hub having a protruding stud onto which the shaft is threadedly fitted. Once the universal fastening lock is attached by the shaft threaded to the stud, the cylindric lock (30) is inserted into the lock housing (28). By turning a unique key in the key hole of the cylindric lock the latch (32) of the lock becomes restricted behind the notch (34) in the inner surface of the lock housing and an access to the drive is no more available and the articles securely fastened to the fastening surface. FIGS. 8 and 9 show vehicle wheel attached with the universal fastening lock to a stud of the wheel hub.

The universal fastening lock having the threading on the inner surface of the shaft can be used in similar manner to attach any item that has a hole suitable for inserting the shaft through to any fastening surface having a stud with threads matching the threads of the surface. Examples of items that may be attached to a fastening surface this way are construction shields, manhole covers, playground devices and so on. The fastening surface can be any solid surface. The universal lock can be made with different lengths and diameter of the shaft for different type of uses.

The universal fastening lock described and claimed here integrates seamlessly into diverse applications, adapting to standard bolt/lug nut fastening systems. The universal fastening lock is user friendly and facilitates straightforward installation for users with varying technical expertise. The universal fastening lock can be provided with fastening elements having shafts with different lengths and diameter thereby providing universal fastening locks for different uses.

LIST OF ELEMENTS

1 Universal fastening lock
2 Groove on an outer surface of the lock housing
5 Groove on an inner surface of the crown
10 Fastening element
12 Shaft
14 Threaded surface of the shaft.
16 Crown
18 Cavity
19 Head
20 Cavity bottom
22 Drive in cavity bottom
24 Retention ring
26 Wave washer or spring
28 Lock housing
30 Cylinder lock
32 Latch of the cylinder lock.
34 Notch inside the lock housing
98 Wheel hub stud
99 Car wheel
100 Manhole cover
101 Attachment element inside a manhole

What is claimed is:

1. A universal fastening lock comprising:

a fastening element having a crown and a shaft comprising a threaded surface;

a lock housing; and a cylinder lock having a latch and being operatable with a unique mechanical key;

wherein the shaft is configured to fasten the universal fastening lock to a fastening surface, and wherein the crown comprises a cavity having a bottom with an access to a drive of the fastening element and a spring/wave washer located on the bottom, and the cavity is configured to rotatably and connectably receive the lock housing by at least one circular retention ring configured to secure an axial position of the lock housing and to fill a space formed by a groove on an outer surface of the lock housing and a groove on an inner surface of the crown, and the spring/wave washer configured to provide tension to the lock housing and for low torque to prevent rotational movement of the lock housing, and wherein the lock housing is configured to adapt the cylinder lock, wherein the universal fastening lock is in locked position when the cylinder lock is turned with the unique key to a position where the latch is restrained by a notch inside the lock housing, and the universal fastening lock is in open position when the cylinder lock is turned with the unique key to a position where the latch is not restrained by the notch, and in the open position the cylinder lock is removable allowing entry to the drive through the bottom of the cavity of the crown to remove the fastening element.

2. The universal fastening lock of claim 1, wherein the shaft is a solid element and the threaded surface of the shaft is on an outer surface of the shaft, and the universal fastening lock is configured to be attached through a hole in an article to the fastening surface by threading the shaft to matching threads of a bore of the fastening surface.

3. The universal fastening lock of claim 1, wherein the threaded surface of the shaft is configured to fit through an attachment hole in a vehicle wheel and the fastening surface is a wheel hub of the vehicle and the threaded surface of the shaft is configured to match threads of a bore on the vehicle hub and the universal fastening lock when in locked position is configured to prevent unauthorized removal of the vehicle wheel.

4. The universal fastening lock of claim 1, wherein the shaft is configured to fit through a hole on a manhole cover and the threaded surface of the shaft is configured to match threads of a bore on a surface inside manhole, and the fastening lock when in locked position is configured to prevent unauthorized opening of the manhole cover.

5. The universal fastening lock of claim 1, wherein the shaft is configured to fit through a hole on a construction shield and the threaded surface of the shaft is configured to match threads of a bore on a surface underneath or behind the construction shield and the fastening lock when in locked position is configured to prevent unauthorized removal of the construction shield.

6. The universal fastening lock of claim 1, wherein the shaft is a hollow element having an inner and an outer surface and the threaded surface of the shaft is on the inner surface, and the universal fastening lock is configured to be attached through a hole in an article to a fastening surface by threading the shaft to matching threads of a stud projecting from the fastening surface, and in open position the cylinder lock is removable allowing entry to the drive through the bottom of the cavity of the crown to remove the fastening element.

7. The universal fastening lock of claim 6, wherein the shaft is configured to fit through an attachment hole in a vehicle wheel and the threaded surface of the shaft is configured to match threads of a stud of a vehicle wheel hub, and the fastening lock when in locked position is configured to prevent unauthorized removal of the vehicle wheel.

8. The universal fastening lock of claim 6, wherein the shaft is configured to fit through a hole on a manhole cover, and the threaded surface of the shaft is configured to match threads of a stud protruding from an inner surface of a manhole, and the fastening lock when in locked position is configured to prevent unauthorized opening of the manhole cover.

9. The universal fastening lock of claim 6, wherein the shaft is configured to fit through a hole on a construction shield, and the threaded surface of the shaft is configured to match threads of a stud protruding from a surface underneath or behind the construction shield, and the fastening lock when in locked position is configured to prevent unauthorized removal of the construction shield.

10. A method to fasten an article to a fastening surface, the method comprising:

providing the universal fastening lock of claim 1;

fitting the shaft of the universal fastening lock through a hole in the article and matching the threading of the shaft with a threading of a stud or a bore on or in the fastening surface;

inserting the cylinder lock into the lock housing and locking the cylindric lock with the unique key, thereby preventing access to the drive of the fastening element through the bottom of the cavity of the crown.

* * * * *